UNITED STATES PATENT OFFICE.

ANTON MIKOLAJCZAK, OF KASTROP, GERMANY, ASSIGNOR TO F. SCHNIEWIND, TRUSTEE, OF NEW YORK, N. Y.

EXPLOSIVE.

948,790.  Specification of Letters Patent.  Patented Feb. 8, 1910.

No Drawing. Original application filed April 18, 1904, Serial No. 203,762. Divided and application filed October 25, 1904. Serial No. 229,961. Again divided and this application filed August 3, 1906. Serial No. 329,055.

*To all whom it may concern:*

Be it known that I, ANTON MIKOLAJCZAK, a subject of the King of Prussia, and residing at Kastrop, Westphalia, Germany, have invented certain new and useful Improvements in the Manufacture of Explosives, of which the following is a specification.

This invention relates to the manufacture of explosives containing dinitroglycerin, and is a division of my application, Serial No. 229,961, filed Oct. 25, 1904, upon which Patent No. 910,936, was issued to me Jan. 26, 1909, and which was a division of my prior application Serial No. 203,762, filed April 18, 1904, upon which Patent No. 798,436 was issued to me Aug. 29, 1905, the manufacture of explosives containing dinitroglycerin having been described, but not claimed, therein.

According to the practice prevailing in the manufacture of dynamite, carbonite and other nitroglycerin explosives prior to my invention the necessary nitroglycerin is prepared in the form of trinitroglycerin of as pure a character as possible, by "nitroglycerin" the glycerin trinitrate $C_3H_5(O.NO_2)_3$ being understood.

In my application, Serial No. 229,961, filed October 25, 1904, as a division of my above application, Serial No. 203,762, the disadvantages incident to the use of nitroglycerin have been set forth and the great advantages of dinitroglycerin in the manufacture of explosives have been pointed out as well as the fact that before my invention dinitroglycerin had never been isolated, its presence in trinitroglycerin having always been a matter of conjecture rather than proof.

I am the first, to have isolated dinitroglycerin and recognized its many desirable and highly valuable characteristics in employing it in the manufacture of explosives. Among other valuable characteristics which I found the dinitroglycerin to possess and which all have been enumerated in my earlier applications above referred to, I discovered that the dinitroglycerin is just as good a solvent and gelatinizing medium for various substances, such as nitro-cellulose, xyloidin etc., as is trinitroglycerin, and in dissolving gelatinizing media in dinitroglycerin, whereby its viscosity is increased, and incorporating some combustible material such as wood-meal with said mixture, highly efficient and valuable explosives can be obtained, of which examples have been given in my above applications.

The absorbent material mixed with the dinitroglycerin may be inert, such as kieselguhr, or a combustible, such, as charcoal or wood-meal, or the absorbent material may be itself an explosive, such as pulp gun-cotton. Before mixing the dinitroglycerin with one of these absorbent materials, which may be done either by hand or by a suitable mixing apparatus, it is preferably rendered more viscous by dissolving therein a gelatinating agent, such as collodion cotton. While the range of collodion cottons soluble in trinitro-glycerin is very narrow, dinitroglycerin, in this respect, is a much better solvent. The variety of soluble pyroxolyn known as pyrocollodion, the nitrogen contents going as high as 12.8% is still soluble in dinitroglycerin, even at ordinary temperature.

As specific examples may be stated: 1. Dinitroglycerin, 70; wood meal, 20; pulp gun cotton, 10. 2. Dinitroglycerin, 70; collodion cotton, 2.50; wood-meal, 20; pulp gun cotton, 7.50.

An example of my method of manufacturing dinitroglycerin has been fully described in my said earlier applications. The dinitroglycerin is obtained as a colorless oil, when the glycerin and the nitric acid, from the mixture of which dinitroglycerin is obtained, are colorless, *i. e.* free from impurities. Dinitroglycerin is soluble in water to a large extent and by reason of this property can very well be obtained quite pure, for instance by fractional evaporation of the water. The well-known solvents for nitroglycerin also readily absorb dinitroglycerin. The percentage of nitrogen according to calculation is 15.38. An actual analysis (nitrometer and organic analysis) showed the average to be 15.38 per centum.

What I claim and desire to secure by Letters Patent is:

1. As a new article of manufacture an explosive containing dinitro-glycerin and absorbent material.

2. As a new article of manufacture an explosive containing dinitro-glycerin having been rendered more viscous by the addition of gelatinating medium and absorbent material.

In testimony whereof I affix my signature in presence of two witnesses.

ANTON MIKOLAJCZAK.

Witnesses:
　WILLIAM ESSENWEIN,
　ERNEST E. SCHOE.